United States Patent [19]

Meyer

[11] 3,868,768

[45] Mar. 4, 1975

[54] METHOD OF PRODUCING A COMPOSITE SUPERCONDUCTOR

[75] Inventor: Gundolf Meyer, Birmenstorf, Switzerland

[73] Assignee: BBC Brown Boveri & Company Limited, Baden, Switzerland

[22] Filed: May 22, 1973

[21] Appl. No.: 362,776

[30] Foreign Application Priority Data

May 31, 1972 Switzerland.......................... 8079/72

[52] U.S. Cl............... 29/599, 148/127, 174/DIG. 6, 335/216

[51] Int. Cl............................................ H01v 11/14

[58] Field of Search........ 29/599; 174/126 CP, 128, 174/DIG. 6; 335/216; 148/127

[56] References Cited

UNITED STATES PATENTS

| | | | |
|---|---|---|---|
| 3,408,235 | 10/1968 | Berghout et al. | 148/6.3 |
| 3,665,595 | 5/1972 | Tanaka et al. | 29/599 |
| 3,730,967 | 5/1973 | Nicol | 174/126 CP |
| 3,737,824 | 6/1973 | Coles | 29/599 X |
| 3,763,552 | 10/1973 | Brown et al. | 29/599 |
| 3,778,894 | 12/1973 | Kono et al. | 29/599 |

FOREIGN PATENTS OR APPLICATIONS

| | | | |
|---|---|---|---|
| 1,039,316 | 8/1966 | Great Britain | 29/599 |

*Primary Examiner*—Richard J. Herbst
*Assistant Examiner*—D. C. Reiley, III
*Attorney, Agent, or Firm*—Pierce, Scheffler & Parker

[57] ABSTRACT

A method for producing electrical super-conductors consisting of a great number of mutually spaced thin filaments of a super-conductive material in which diffusion is effected in mutually spaced zones between two adjoining metallic layers, one being vandium and the other a copper-gallium alloy by establishing similar mutually spaced zones in the layers in which the diffusion is either prevented or the superconductive properties of the inter-metallic compound formed by the diffusion is the superconductive properties of the inter-metallic compound formed by the diffusion is considerably reduced. In one mode of the method, mutuallly spaced zones of non-diffusion in the layers are established by use of mutually spaced zones of molybdenum or tantalum between the layers which prevent interdiffusion therebetween from taking place. In another mode of the method, mutually spaced zones of diminished super-conductive properties are established by use of mutually spaced zones of tin or aluminum which are caused to be diffused into the vanadium layer.

13 Claims, 2 Drawing Figures

METHOD OF PRODUCING A COMPOSITE SUPERCONDUCTOR

Figure 1:
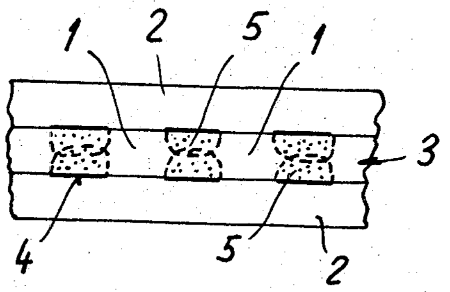

This invention is directed to an improved method for the manufacture of a super-conductor with a great number of thin filaments of super-conductive material and wherein the super-conductive filaments are formed by diffusing at least one first material into a second material consisting of two layers placed side-by-side, as well as the practical application of the method.

It is known in the case of super-conductors that the smaller their dimensions vertically to their conductor axis, the lower will be their losses when they carry alternating current and/or generate a pulsating field, and that the losses will approximately decrease proportionally to their diameter. It is for this reason the superconductors used for pulsating magnets or a.c. installations are composed of a multitude of super-conductive single conductors, imbedded in a matrix which contains for stabilization purposes highly conductive copper and besides a poorly conductive matrix, arranged in such manner that shunt current between the filaments, which will also cause magnetic losses, must always flow through these high-impedance layers and will thus die out rapidly. Furthermore, the conductor should be twisted if necessary.

A known species of a conductor with thin filaments made of NbTi comprises a poorly conductive matrix which is made of a CuNi alloy and surrounds the filaments, and a highly conductive copper matrix which can be arranged between the filament and the alloy cover as well as between the alloy covers.

When used within the range of 1 Hz operations, the filaments must be less than 10 $\mu$, and within the range of 50 Hz less than 1 $\mu$. In principle it is feasible to manufacture such filaments from NbTi but the technical outlay is rather considerable for conductors with profiles in the magnitude of 1 – 10 mm$^2$ of profile with more than 20,000 filaments.

Recently, super-conductors consisting of the intermetallic compound $V_3Ga$ have become known which possess higher critical temperatures, higher critical fields and higher critical current densitites than NbTi, and can probably be produced at lower costs inspite of the more expensive material. First generator conductor types made from such material are now known but their super-conductor dimensions are still relatively large (> 5 $\mu$), and they have a high sectional ratio between matrix and super-conductor.

The intermetallic compound $Nb_3Sn$, which has also advantageous electrical characteristics similar to the $V_3Ga$, has been known for a long time, but so far it has not been possible yet to produce very fine filaments from this material.

All methods of record have the disadvantage that even though thin layers of $V_3Ga$ can be produced, these layers always will occur in a tape-like or a relatively bulky form within the matrix if the manufacturing methods being used are economically justifiable. However, in the case of variable magnetic fields vertically to these tapes, the losses of the alternating currents and of the pulsating fields are determined by the width of the tape rather than by its thickness.

The principal objective of the invention to establish a method for the manufacture of a super-conductor where the above discussed disadvantages will be avoided.

The method proposed by the invention is characterized by the features that between the two layers, in the direction of the super-conductive filaments to be formed, there is arranged a foreign substance in tape form or which is caused to diffuse within at least one of the layers, which will prevent, during the thermal treatment to which the final conductor is to be subjected, an inter-diffusion of the materials forming a super-conductive compound, or which will diminish or eliminate the super-conductive properties of such compound, that thereupon the entire unit is deformed mechanically in such manner that a metallurgical intimate connection will be created between the adjacent layers, and that finally the product, so deformed, is subjected to the thermal treatment.

It will be advantageous to utilize for the two adjacent layers one layer consisting of V and another layer consisting of CuGa.

For some intended uses it can also be advantageous to join three layers with each other and to select their materials in such manner that the super-conductive filaments are formed within the center layer.

It will be expedient to place the foreign substance in tape-form onto the layers containing the second material and allow it to diffuse by means of a thermal treatment.

When preparing a super-conductor, consisting for example of at least three layers, it will be advantageous to apply the foreign substance on both sides and at exactly opposite places of the layer consisting of the second material because otherwise during the mechanical deformation the foreign substance which is arranged in tape form and is located on both sides of the layer consisting of the second material could shift relative to each other in an undesirable manner.

It will be advantageous to apply the foreign substance to the layer consisting of the second material by depositing it through evaporation, by dusting it on, by spraying it on, by rolling it on, or by baking it onto the layer.

It will be advantageous to use as a foreign substance which is to prevent the materials, forming the super-conductive compounds, from diffusing with each other, a material which reacts substantially more poorly with the first material than with the second material, for example molybdenum or tantalum.

It will also be expedient if, for the purpose of diminishing or eliminating the super-conductive properties of the super-conductor at operating temperature, a material is selected as foreign substance which will react with the material of the second layer substantially as strongly as the material of the first layer, for example tin or aluminum.

It can also be advantageous if the foreign substance is applied to the layer containing the second material as a coating of uniform thickness, this coating then be diffused at the locations desired by means of an electron beam, and the remaining portion of the not-diffused foreign substance be removed, for example by means of an acid.

An object of the invention is also the practical application of the method for the manufacture of a super-conductor with a great number of thin super-conductive filaments made from $V_3Ga$.

Figure 2:
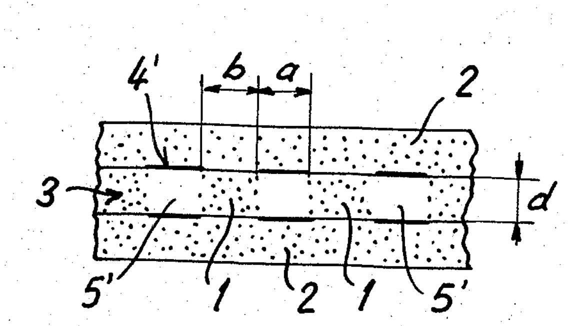

The invention will be explained in detail below in conjunction with the accompanying drawing depicting two embodiments wherein:

FIG. 1 gives a sectional view of a first embodiment of a super-conductor prepared in accordance with the invention, and FIG. 2 gives a sectional view of a second embodiment of a super-conductor prepared in accordance with the invention.

The improved method of the invention is described in detail, with the intermetallic compound $V_3Ga$ being used as super-conductive material but it is obviously also possible to use other similar compounds for this purpose.

FIG. 1 shows that a super-conductor with a great number of very thin filaments of $V_3Ga$ as super-conductive material is prepared in that manner that the super-conductive filaments 1 by the diffusion of gallium from a CuGa layer 2 within and into the vanadium of an adjacently located vanadium layer 3.

Actually a vanadium layer 3 is located between two of the layers 2 and also arranged, between each layer 2 and the layer 3 in the direction of the super-conductive filaments 1 to be formed, is a foreign substance 4 for example in tape form of tin or aluminum, which, by diffusing into the zone 5 of the vanadium layer 3 located under it, will greatly reduce the super-conductive properties of the $V_3Ga$ compound generated during the thermal treatment to which the final conductor is to be subjected. The foreign substance in the form of mutually spaced tapes 4 is applied to opposite sides of the center vanadium layer 3 and at exactly opposite places so that the impregnation of the center layer 3 by the foreign substance within the desired mutually spaced zones 5 takes place throughout the entire thickness of layer 3.

After placement of the foreign substance 4 onto the intermediate vanadium layer 3, the two outer CuGa layers 2 which fit closely against the center layer 3 are then mechanically worked as a unit in such manner that a metallically intimate connection is established between the adjacent layers 2 and 3. The product so worked is then subjected to a thermal treatment so that the gallium of the first layers 2 diffuses into the center vanadium layer 3, forming there the super-conductive material $V_3Ga$ which constitute the super-conductors 1.

The penetration of the foreign substance 4 into the spaced zones 5 of the center layer 3 is accomplished, depending on the type of this substance, either simultaneously with the formation of the super-conductive $V_3Ga$ compound, or by an additional thermal treatment prior to the formation of the super-conductive $V_3Ga$ compound by means of the final thermal treatment.

It is also possible to apply the foreign substance in the form of a coating of uniform thickness at the center vanadium layer 3, and to cause its diffusion into the layer 3, at the mutually spaced places desired, by means of an electron beam, and to remove the remainder of the undiffused foreign substance, for example by means of an acid.

It is also feasible to apply the foreign substance as a coating of uniform thickness at the center vanadium layer and to remove the substance at the places desired, for example by means of spark erosion or electrolysis thereby leaving the parallel spaced zones 5 coated with the substance 4.

The diffusion of the foreign substance 4 into the zones 5 which exist between the individual super-conductive filaments 1 will cause the material within the latter to become so highly resistive that the flow of eddy currents from one filament 1 to the adjacent filament will be dampened substantially. However, the zones 5 must not be resistive to a higher degree than the material of the outer CuGa layers 2 because otherwise such flow could take place simply by way of the outer layers 2.

If, for example, tin or aluminum are used as the foreign substance, a thermal treatment will generate zones 5 which are contaminated by these substances and which are not super-conductive at the operating temperature of the super-conductor at approximately 4.2°K.

The preparation of the super-conductor, shown by FIG. 2, possessing a great number of very thin parallel spaced filaments 1 composed of $V_3Ga$ as super-conductive material, is similar to the above described example, the difference being that between the outer CuGa layers 2 and the center vanadium layer 3 there is arranged a foreign substance, for example molybdenum or tantalum in the form of mutually spaced tapes 4' which act as a diffusion barrier to prevent the gallium of the CuGa layers 2 from reaching the zones 5' which are formed between the foreign-substance tapes 4'. As a result thereof, a super-conductive compound cannot arise within the zones 5' of the center vanadium layer 3. Obviously, it is also possible to place the foreign substance at those sides of the CuGa layers 2 which face the vanadium layer 3, but in case of a super-conductor consisting of three layers, as illustrated in FIGS. 1 and 2, it would be very difficult to ensure that the foreign substance, after the mechanical deformation for the intimate connection of the adjacent layers, is still positioned on both sides of the center layer at precisely opposite locations.

It will be expedient in many instances if the width *a* and the distance apart *b* of the non-super-conductive areas 5 which are generated between super-conductive filaments 1 being formed, is made equal in magnitude to the thickness *d* of the center layer 3.

I claim:

1. In the method for producing electrical super-conductors consisting of a great number of mutually spaced thin filaments of an intermetallic super-conductive compound by diffusion of a first metallic material from each of two outer layers of a three-layer metallic structure into a second metallic material of the intermediate layer therebetween, the improvements which comprise the steps of arranging at the interfaces between opposite faces of said intermediate layer and the adjoining faces of said two outer layers mutually spaced zones of a foreign substance extending in the longitudinal direction of the to be produced super-conductors, mechanically working the three-layer metallic structure as a unit to establish a metallurgically intimate connection between said layers, and subjecting the connected layers to a thermal treatment to effect the desired diffusion from said outer layers into said intermediate layer in mutually spaced longitudinally extending zones between mutually spaced longitudinally extending zones of said foreign substances said mutually spaced zones of said foreign substance functioning to prevent diffusion within said intermediate layer at its zones or to at least greatly reduce the superconductive properties of the intermetallic compound formed at its zones by diffusing into said intermediate layer.

2. The method for producing electrical superconductors as defined in claim 1 wherein said intermediate layer is constituted by vanadium and said two outer layers are constituted by an alloy of copper and gallium.

3. The method for producing electrical superconductors as defined in claim 1 wherein said mutually spaced zones of the foreign substance are established by mutually spaced tapes extending in the longitudinal direction of the super-conductors to be produced and from which the foreign substance is then diffused into said intermediate layer by thermal treatment.

4. The method for producing electrical superconductors as defined in claim 1 wherein said mutually spaced zones of said foreign substance extending in the longitudinal direction of the super-conductors to be produced lie exactly opposite to each other at opposite faces of said intermediate layer.

5. The method for producing electrical superconductors as defined in claim 1 wherein said mutually spaced zones of the foreign substance are established by coatings of the foreign substance on the opposite faces of said intermediate layer.

6. The method for producing electrical superconductors as defined in claim 1 wherein said mutually spaced zones of the foreign substance are established by coating the entire surfaces of the opposite faces of said intermediate layer with said foreign substance, effecting diffusion of the coated-on substance into said intermediate layer by application thereto of an electron beam along the desired mutually spaced zones, and then removing the non-diffused portions of the substance between the diffused-in zones.

7. The method for producing electrical superconductors as defined in claim 1 wherein said mutually spaced zones of the foreign substance are established by coating the entire surfaces of the opposite faces of said intermediate layer with said foreign substance and then removing the coating along mutually spaced zones.

8. The method for producing electrical superconductors as defined in claim 1 and which includes the step of diffusing the mutually spaced zones of the foreign substance into said intermediate layer by thermal treatment in advance of a final heat treatment by which the diffusion from said outer layers into said intermediate layer is effected thereby to establish the mutually spaced super-conductive filaments.

9. The method for producing electrical superconductors as defined in claim 1 and wherein the mutually spaced zones of the foreign substance are established by thermally induced diffusion of the foreign substance into said intermediate layer simultaneously with a final heat treatment by which diffusion from said outer layers into said intermediate layer is effected thereby to establish the mutually spaced superconductive filaments.

10. The method for producing electrical superconductors as defined in claim 1 wherein the width and distance apart between the mutually spaced zones of the foreign substance establishing non-super-conductor zones are equal to the thickness of said intermediate layer.

11. The method for producing electrical superconductors as defined in claim 1 wherein said mutually spaced zones of the foreign substance are established by wires or strips thereof inserted at the interfaces between said intermediate layer and said two outer layers and including the further step of compressing the whole by rolling.

12. The method for producing electrical superconductors as defined in claim 1 wherein said mutually spaced zones of the foreign substance between said intermediate layer and said two outer layers function to prevent diffusion of material from said two outer layers into said intermediate layer, said foreign substance being selected from the group consisting of molybdenum and tantalum.

13. The method for producing electrical superconductors as defined in claim 1 wherein said mutually spaced zones of the foreign substance between said intermediate layer and said two outer layers diffuse into said intermediate layer thereby diminishing the superconductive properties of the formed intermetallic compound at said zones at operating temperature of the super-conductors, said foreign substance being selected from the group consisting of aluminum and tin.

* * * * *